(12) United States Patent
Wang et al.

(10) Patent No.: US 11,182,431 B2
(45) Date of Patent: Nov. 23, 2021

(54) VOICE SEARCHING METADATA THROUGH MEDIA CONTENT

(71) Applicant: Disney Enterprises, Inc., Burbank, CA (US)

(72) Inventors: Jing X. Wang, Monterey Park, CA (US); Mark Arana, West Hills, CA (US); Edward Drake, Stevenson Ranch, CA (US); Alexander C. Chen, La Canada, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/568,083

(22) Filed: Dec. 11, 2014

(65) Prior Publication Data
US 2016/0098998 A1 Apr. 7, 2016

Related U.S. Application Data

(60) Provisional application No. 62/059,703, filed on Oct. 3, 2014.

(51) Int. Cl.
| | |
|---|---|
| *G06F 16/9032* | (2019.01) |
| *G10L 25/54* | (2013.01) |
| *G06F 16/78* | (2019.01) |
| *G06F 16/783* | (2019.01) |
| *G06F 16/432* | (2019.01) |

(Continued)

(52) U.S. Cl.
CPC ...... *G06F 16/90332* (2019.01); *G06F 16/433* (2019.01); *G06F 16/4387* (2019.01); *G06F 16/44* (2019.01); *G06F 16/48* (2019.01); *G06F 16/683* (2019.01); *G06F 16/7844* (2019.01); *G06F 16/7867* (2019.01); *G10L 25/54* (2013.01); *H04N 21/4826* (2013.01); *H04N 21/4828* (2013.01); *G10L 15/26* (2013.01)

(58) Field of Classification Search
CPC .............. G10L 15/26; G06F 17/30749; G06F 17/30755; G06F 17/30026; G06F 17/30746; G06F 17/30796
See application file for complete search history.

(56) References Cited

U.S. PATENT DOCUMENTS

| | | | | |
|---|---|---|---|---|
| 6,397,181 B1 * | 5/2002 | Li | ............................ | G10L 15/08 |
| | | | | 704/256.4 |
| 6,907,397 B2 * | 6/2005 | Kryze | ................... | G06F 16/433 |
| | | | | 704/251 |

(Continued)

OTHER PUBLICATIONS

Third Office Action in Chinese Patent Application No. 2015106400318, dated May 29, 2019.

(Continued)

*Primary Examiner* — Samuel G Neway
(74) *Attorney, Agent, or Firm* — Patterson + Sheridan, LLP

(57) ABSTRACT

Systems and methods for voice searching media content based on metadata or subtitles are provided. Metadata associated with media content can be pre-processed at a media server. Upon receiving a vocal command representative of a search for an aspect of the media content, the media server performs a search for one or more portions of the media content relevant to the aspect of the media content being searched for. The media performs the search by matching the aspect of the media content being searched for with the pre-processed metadata.

20 Claims, 7 Drawing Sheets

RECEIVE VOCAL INPUT FROM A USER DEVICE

200

SEARCH FOR AT LEAST ONE PORTION OF MEDIA CONTENT BASED ON THE VOCAL USER INPUT

202

PROVIDE ACCESS TO THE AT LEAST ONE PORTION OF MEDIA CONTENT VIA THE USER DEVICE

204

(51) Int. Cl.
*G06F 16/683* (2019.01)
*G06F 16/44* (2019.01)
*G06F 16/48* (2019.01)
*H04N 21/482* (2011.01)
*G06F 16/438* (2019.01)
*G10L 15/26* (2006.01)

(56) References Cited

U.S. PATENT DOCUMENTS

| | | | | |
|---|---|---|---|---|
| 7,988,560 | B1* | 8/2011 | Heller | A63F 9/24 463/40 |
| 8,132,103 | B1* | 3/2012 | Chowdhury | H04N 21/23418 715/723 |
| 2001/0047377 | A1* | 11/2001 | Sincaglia | H04N 7/173 718/1 |
| 2003/0184598 | A1* | 10/2003 | Graham | G11B 27/034 715/838 |
| 2007/0011133 | A1* | 1/2007 | Chang | H04M 3/4938 |
| 2007/0027844 | A1* | 2/2007 | Toub | G11B 27/105 |
| 2008/0154870 | A1* | 6/2008 | Evermann | G10L 15/08 |
| 2008/0249770 | A1* | 10/2008 | Kim | G10L 15/08 704/231 |
| 2009/0150159 | A1* | 6/2009 | Ahlin | G06F 16/634 704/275 |
| 2009/0190899 | A1* | 7/2009 | Bangalore | G10L 15/26 386/244 |
| 2009/0287650 | A1* | 11/2009 | Cha | G06F 16/632 |
| 2010/0010814 | A1* | 1/2010 | Patel | G10L 15/22 704/257 |
| 2010/0076763 | A1* | 3/2010 | Ouchi | 704/246 |
| 2010/0262618 | A1* | 10/2010 | Hedinsson | G06F 16/70 707/770 |
| 2011/0015932 | A1* | 1/2011 | Su | G06F 16/632 704/275 |
| 2013/0013305 | A1* | 1/2013 | Thompson | G06F 16/745 704/235 |
| 2014/0188997 | A1* | 7/2014 | Schneiderman | H04L 51/32 709/204 |
| 2016/0098998 | A1* | 4/2016 | Wang | G06F 16/90332 704/246 |

OTHER PUBLICATIONS

First Office Action in CN Application No. 2015106400318, dated Apr. 28, 2018.
Second Office Action in CN Application No. 2015106400318, dated Nov. 27, 2018.

* cited by examiner

VOICE SEARCHING METADATA THROUGH MEDIA CONTENT

CROSS-REFERENCE TO RELATED APPLICATIONS

This application claims the benefit of U.S. Provisional Patent Application No. 62/059,703 filed on Oct. 3, 2014, which is incorporated herein by reference in its entirety.

TECHNICAL FIELD

The present disclosure relates generally to media content playback and interaction.

DESCRIPTION OF THE RELATED ART

Traditional methods of interacting with media content via a digital video disk (DVD) or video cassette recorder (VCR) generally rely on actuating playback buttons or controls. For example, a user may fast forward or rewind through portions of the media content, e.g., scenes of a movie, to achieve playback of a particular portion of the media content that the user wishes to view or experience. Media interaction on devices such as smart phones, laptop personal computers (PCs), and the like mimic such controls during playback of media content being streamed or downloaded to the device.

BRIEF SUMMARY OF THE DISCLOSURE

In accordance with one embodiment, a computer-implemented method comprises receiving vocal input from a user via a user device. The computer-implemented method further comprises searching for at least one portion of media content based on the vocal user input. Further still, the computer-implemented method comprises providing access to the at least one portion of the media content via the user device.

In accordance with another embodiment, an apparatus comprises a content database containing one or more media content files. The apparatus further comprises a speech recognition unit configured to recognize voice commands representative of a search for at least one portion of the one or more media content files. Additionally still, the apparatus comprises a search engine configured to search for the at least one portion of the one or more media content files based on the recognized voice commands.

In accordance with still another embodiment, a device comprises a processor, and a memory including computer program code. The memory and the computer program code are configured to, with the processor, cause the device to perform at least the following: display a user interface adapted to receive vocal input requesting a search for one or more portions of media content; forward the vocal input to a media content server configured to perform the search for the one or more portions of media content; and receive search results from the media content server for presentation on the device, wherein the search results are presented in a manner commensurate with the level of relevance to the vocal input.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

As previously described, traditional methods of interacting with media may involve a user fast forwarding or rewinding through media content to achieve playback of a particular portion of the media content. In the case of a DVD, a user that wishes to view a particular scene in a movie generally fast forwards and rewinds the movie during playback until the desired scene is reached. Alternatively, a user may skip to a particular "chapter" of the movie. However, the level of granularity that can be achieved with conventional interaction methods is often rough or imprecise.

The use of smart phones or tablet PCs that have small displays (relative to conventional TVs or monitors) can often exacerbate the imprecise nature of conventional media interaction. This is because the playback controls or mechanisms on such devices are commensurately small as well.

Moreover, conventional methods of searching media content rely on text-only searching, and often only retrieves complete versions of media content, or retrieves specific 'frames' in the context of movie media based upon text-only metadata such as subtitle information.

Accordingly, various embodiments described in the present disclosure provide systems and methods that allow a user to use voice commands or inputs to search for one or more portions (e.g., one or more scenes) of media content (e.g., one or more movies) that are of interest to the user. Media content in the context of the present disclosure can be any type of media content, such as movies, music, audio books, and the like. A user is not limited to searching for a particular portion of a single media content during playback via voice commands or input. For example, a user may search for content in one or more content repositories, digital libraries, or databases. Further still, and based upon the particular voice commands issued by the user, truncated versions of media can be accessed, generated, and/or presented, e.g., storylines, relevant scenes that are stitched together, etc.

Figure 1:
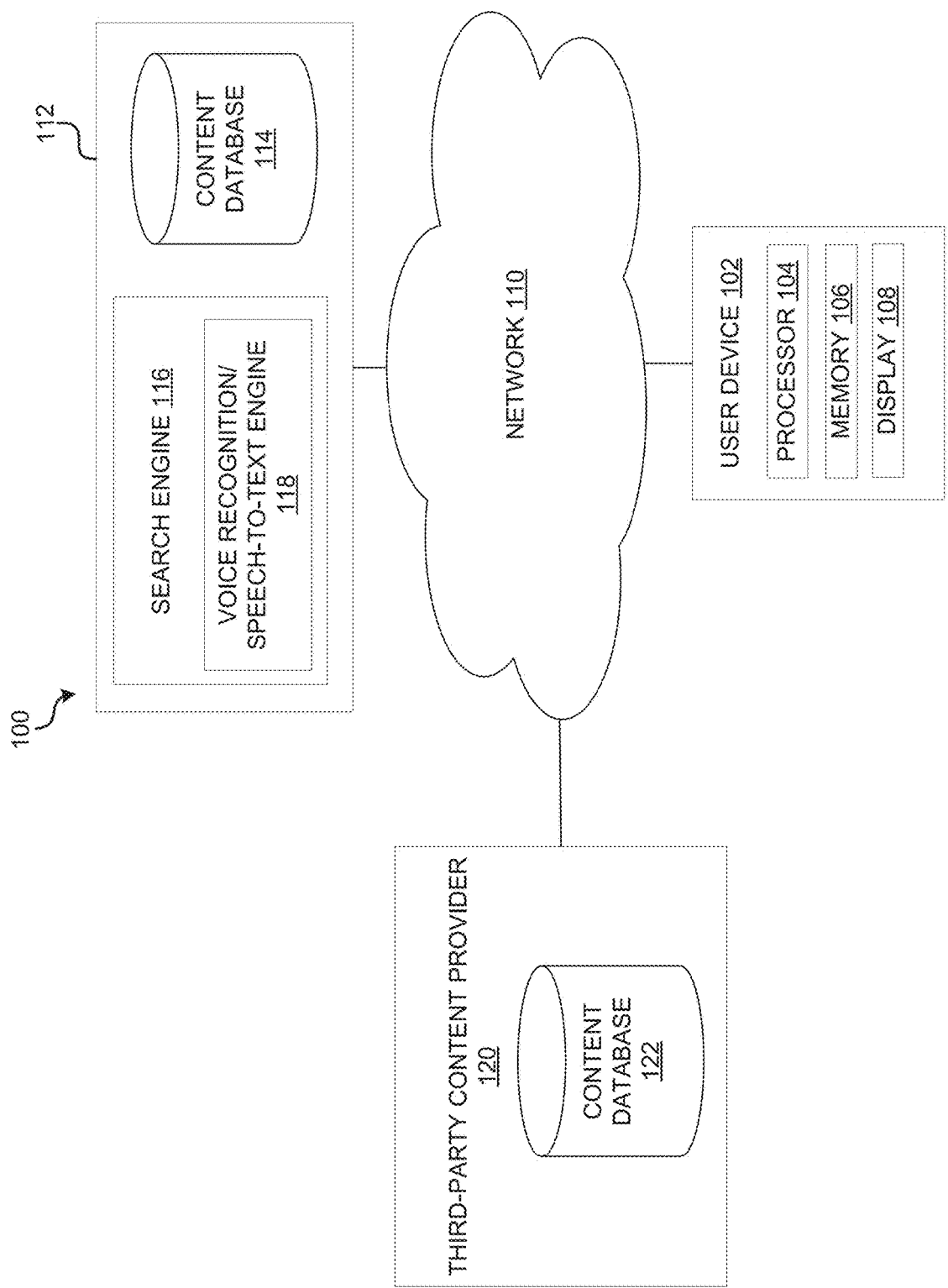
FIG. 1 illustrates an example environment in which various embodiments may be implemented.

FIG. 1 is a diagram illustrating an example environment in which various embodiments can be implemented. FIG. 1 illustrates a system 100 for providing voice searching of media content. As illustrated in FIG. 1, system 100 can include a user device 102. User device 102 may include a processor 104 and a memory unit 106, and can be configured to receive digital media content for presentation on a display 108. User device 102 may further be configured to access a list of media content stored on a content database or repository such as an electronic program guide, an online media store, etc. As alluded to previously, device 102 may be a tablet PC, a smart phone, a laptop PC, etc.

System 100 may further include a media server 112, which may be operated by a content provider, such as a cable provider (e.g., COMCAST®), YouTube®, a digital media content distributor, such as Amazon®, iTunes®, Netflix® or other third-party distributor. Media server 112 may include a content database 114 on which digital media content can be stored. Media server 112 may further include a search engine 116 for performing searches of media content or portions of media content based on the user's voice commands or input. Search engine 116 may include a voice recognition/speech-to-text engine (or other translation engine) for receiving and analyzing/translating the user's voice commands or input into search instructions that can be understood and followed by search engine 116. Further still, system 100 may include a third-party content provider 120, which may include and/or control its own content database 122. In certain scenarios, third-party content provider 120 may provide content from media server 112 (e.g., by accessing content database 114 and forwarding media to user device 102). It should be noted that system 100 may include more or less media servers, content providers, and/or user devices.

Communications between one or more of media server 112, third-party content provider 120, and/or user device 102 can be effectuated over a network 110. Network 110 may be any communications network such as a cellular or data network, a satellite network, an intranet, an extranet, a virtual private network (VPN), a local area network (LAN), a wireless LAN (WLAN), a wide area network (WAN), a personal area network (PAN), a portion of the Internet, a portion of the Public Switched Telephone Network (PSTN), or any combination thereof. Accordingly, network 110 may employ various communication media, such as a coaxial cable, fiber optic cable system, Ethernet, radio waves, etc.

In accordance with various embodiments, searching for or through media content can be accomplished using metadata. That is, metadata can be 1) included in a media content file by an originator, such as the producer, or editor, 2) automatically generated by a computer during production or editing of the media content file (scene description, time, location, characters), and/or 3) generated by one or more users. In the case of YouTube® media content, for example, metadata can include user-inserted keywords, tags, titles, annotations, and the like. In the case of studio-produced media content, metadata may include frame information, indexing information, links to enhanced or supplemental content, etc. It should be noted that the types and/or amount of metadata in various types of media content can differ. For example, computer animated media content may have large amounts of metadata associated with it (e.g., metadata about objects) as a result of the content itself being computer-generated.

Moreover, metadata can be associated with media content at any time, e.g., during production, or subsequent to viewing by a user. For example, users that have viewed or experienced a particular piece of media content may provide feedback or 'third-party' metadata that can be accessed, mined, aggregated, etc., from fan websites or social media outlets and services. Such third-party metadata can then be associated with the media content and subsequently indexed.

Additionally still, metadata as described herein may further include temporal metadata that can provide time-based information and/or access to one or more portions of media content on its own or in conjunction with other types of metadata. For example, temporal metadata can be included that represents mood on a media content timeline, where users can search for a particular chapter, scene, shot by mood or, e.g., skip depressing portions of the media content.

Such metadata can be associated with a particular media content file, or a specific scene or camera shot angle in a movie (group of frames) as embedded metadata, linked metadata, etc. A scene can be a sequence of frames with a start frame and an end frame, where the frames relate to an event, part, or location of the story. Metadata can include, but is not limited to the following: actor(s)/actress(es) name (actual name and character role name); song lyrics of a movie soundtrack song; movie dialog; song title; scene title; scene description; film location; shooting location; story location, product shown or included in a particular scene; emotions; objects; actions; acoustic or audio fingerprints; keywords; and/or any other indicia that may be associated with one or more portions of the media content. Alternatively or in addition to metadata, subtitles can be leveraged as a basis for media content searching.

Prior to sending the media content, media server 112 can pre-process media content by searching or parsing any metadata included or otherwise associated with a media content file. Upon receiving a voice command or input from user device 102, voice recognition/speech-to-text engine 118 can analyze the voice command or input to determine what a user of user device 102 is searching for. Voice recognition/speech-to-text engine 118 can then translate the voice command or input into a format that search engine 116 can utilize to search for any pre-processed metadata of the relevant media content file(s) stored in, e.g., content database 114, that matches or meets the search criteria identified in the voice command or input. Upon completing the search, any relevant media content or portions of media content (such as a scene or group of related scenes) can be transmitted, presented, or identified on user device 102.

Pre-processing of the metadata may include considering one or more 'associative' or 'thematic' aspects of media content. For example, and in accordance with some embodiments, the metadata can be utilized to identify one or more scenes rather than mere frames of media content. That is, one or more scenes considered together can be used to present, e.g., plot themes, plot points, one or more groups of pictures (GOPs), etc.

Hence, content database 114 may further include the pre-processed metadata which can be linked with (such as through the use of pointers) or otherwise associated with media content. For example, content database 114 may be partitioned into a pre-processed metadata portion and a portion in which media content is stored. Alternatively, additional databases or data repositories for storing metadata (not shown) may be implemented in media server 112 or can be remotely accessed by media server 112, where, e.g., pointers or other associative mechanisms, can link media content stored in content database 114 and the pre-processed metadata.

It should be noted that use of voice recognition/speech-to-text engine 118 at the server 112 can provide a more accurate interpretation or translation of a user's voice command(s) or input(s), as more intensive processing and analysis can be performed on media server 112. However, in accordance with other embodiments, voice recognition can be performed locally on user device 102.

Figure 2:
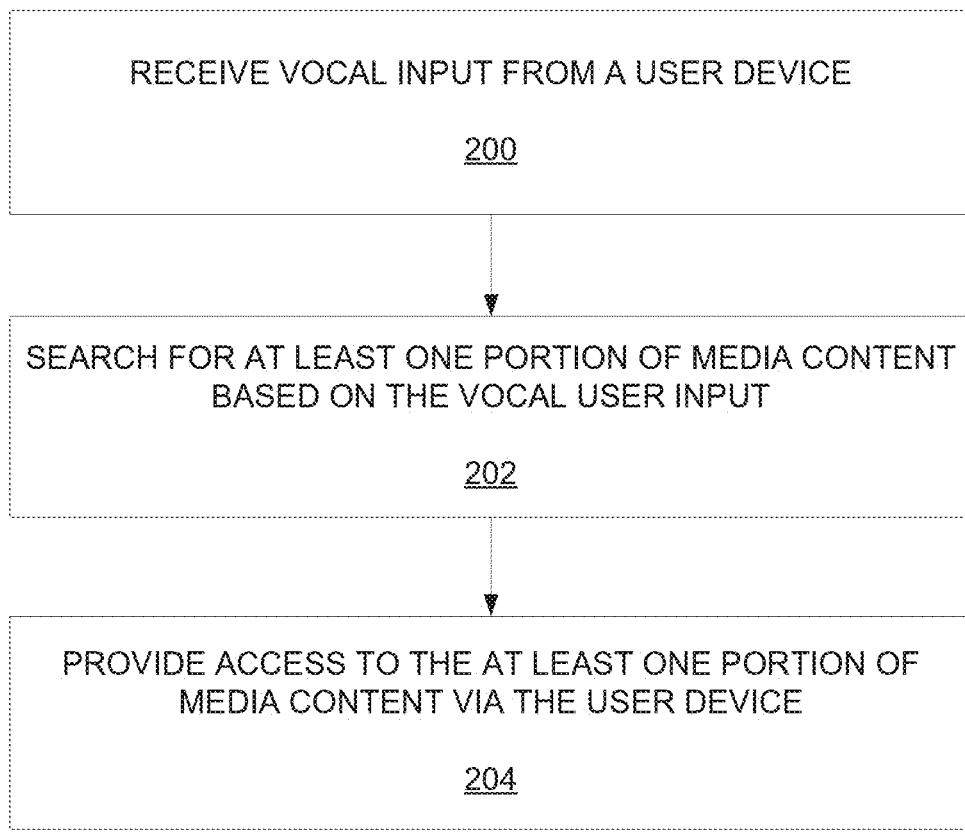
FIG. 2 is an operational flow diagram illustrating an example process for voice searching through a video file in accordance with various embodiments.

FIG. 2 is an operational flow chart illustrating example operations that may be performed by a media server, e.g., media server 112, for providing the above-described voice searching functionality in accordance with various embodiments. At operation 200, vocal input is received from a user device. As described above, a user may use a device such as a smart phone to input a voice command representative of a search for one or more portions of media content while the user is watching, listening, or otherwise experiencing the media content. At operation 202, at least one portion of media content is searched for based on the vocal user input. That is, media server 112 may search for metadata associated with one or more parts (frames, GOPs, scenes, etc.) in a media content file that matches or meets the search criteria identified in the vocal user input. For example, if the user's voice command or input requests scenes within a movie in which a famous weapon is shown, media server 112 can search the movie media content file for scenes in which the associated metadata or subtitle(s) reference or include the famous weapon. As another example, and in response to a user requesting to be shown "the origin of super hero X," the media server 112 may search for scenes presenting how super hero X obtained his/her super powers.

The scenes may be contiguous (e.g., scenes following each other chronologically), or the scenes may be non-contiguous. In the case of non-contiguous scenes, the media server 112 may stitch the non-contiguous scenes together.

At operation 204, access to the at least one portion of media content is provided via the user device. Following the above example, media server 112 can instruct, e.g., a media player application on user device 102, to present a modified progress bar in which the relevant scenes are highlighted or otherwise indicated. In accordance with still other embodiments, as will be described in greater detail below, other portions of media content (besides the currently-experienced media content) that have some relevance based on the user's vocal input may be returned to the user as search results. That is, the user may engage in voice-based searching in the context of content discovery.

Figure 3:
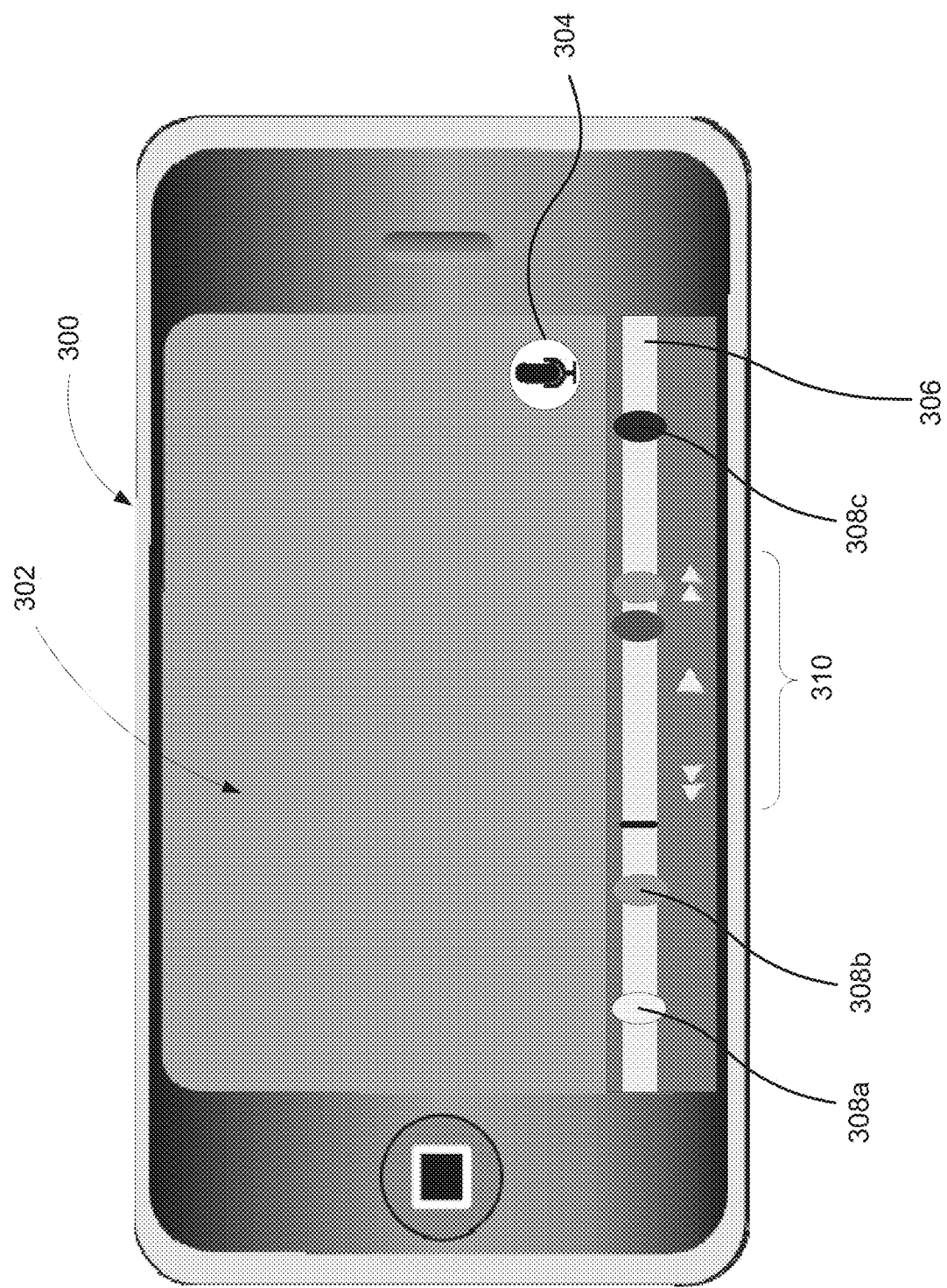
FIG. 3 illustrates an example user interface for performing voice searching in accordance with various embodiments.

FIG. 3 is an example of a graphical user interface (GUI) of a media player application implemented on a smart phone 300, which may be one embodiment of user device 102. As illustrated in FIG. 3, smart phone 300 may include a display 302 on which media content, such as streamed or downloaded movie file, can be displayed via a media player application. At any point during playback of the streamed movie file, a user can, e.g., swipe or otherwise activate voice command button 304. Upon activating voice command button, the user may speak a command requesting a search for one or more portions (e.g., "show me all the action scenes") or aspects of interest regarding the streamed/downloaded movie file. For example, the user may wish to view a scene in the streamed movie file during which a particular song is played. The user may speak the name of the song, hum or sing lyrics of the song, etc. Smart phone 300 may digitize and process the speech/singing of the user for transmission to media server 112 via network 110. As described above, voice recognition/speech-to-text engine 118 may analyze or translate the speech/singing, and search engine 116 may perform the requisite search. Upon finding one or more matches to the speech/singing, media server 112 may instruct the media player of smart phone 300 to display the scene in which the desired song is played. Alternatively, the media player GUI may present a cursor or other indicator on a progress bar 306 indicating where the user can skip to in order to view the relevant scene.

Alternatively still, and as illustrated in FIG. 3, the media player GUI may display a "heat map" on or associated with progress bar 306. This can be useful when, e.g., multiple scenes or portions of media content may potentially be relevant to the user's search. For example, one or more markers 308a, 308b, 308c, etc., may be displayed on progress bar 306. The one or more markers may be distinguished using, e.g., varying degrees of color. The distinguishing colors can be representative of a relevance score (which can be calculated by search engine 116). That is, search engine 116 may complete a search and determine that multiple scenes could potentially meet the search criteria spoken by the user. In such a scenario, search engine 116 may determine, e.g., by the amount of matching metadata or subtitles in a scene, a potential relevance to the search criteria. The user may then touch/interact with the heat map and/or use playback buttons 310 to view the relevant scenes indicated by the heat map. Moreover, and instead of the one or more markers, relevant portions of media content can be identified using, e.g., representative thumbnail images overlaid on progress bar 306.

It should be noted that various embodiments are not limited to a linear single point searching experience, as can be the case with conventional systems and methods of media content interaction. Instead, and as described above, various embodiments can present a user with entire scenes, shots, or portions of media content (whether the media content is a movie, a song, an audio book, or other media type). Moreover, the user can be presented with multiple options for viewing the one or more portions of media content, e.g., selecting where to begin viewing the relevant portions of media content, etc. Moreover, the media server 112 can stitch together derivative media content such as story lines or relevant portions of media content or multiple scenes and provide them to the user device.

Further still, the user can search for media content that has not yet been displayed or experienced, which can achieve enhanced methods of content discovery. For example, instead of searching for desired media content using conventional methods of textual-based searching, a user may employ voice-based searching for media content of interest based on a myriad of indicia/metadata such as those described previously.

Figure 4A:
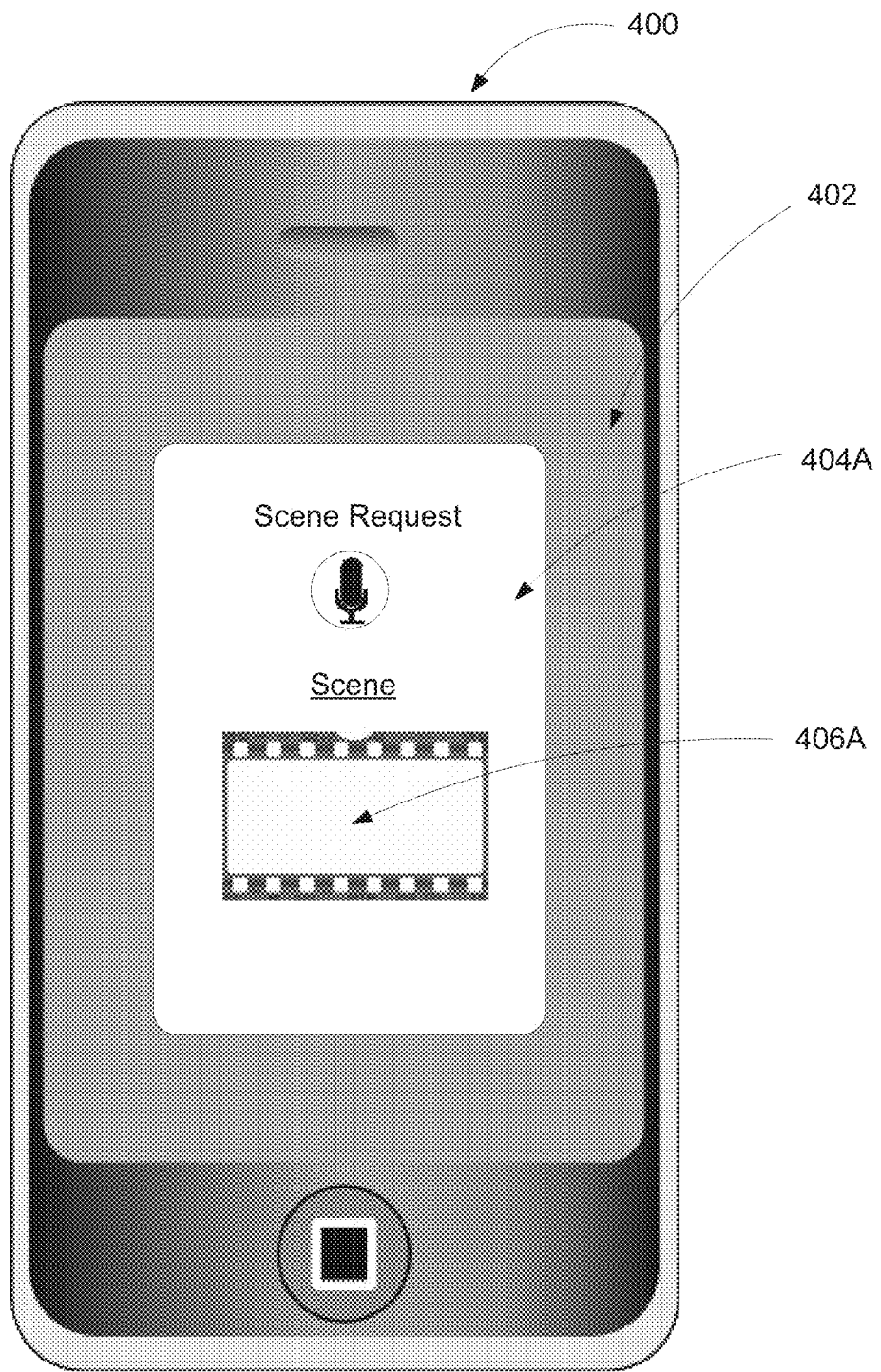
FIG. 4A illustrates an example simple user interface for performing voice searching and displaying search results in accordance with embodiment.

Various GUIs may also be presented to the user through which a voice-based search can be conducted and media content search results can be presented. FIG. 4A illustrates one embodiment of the present disclosure in which a 'simple' search GUI may be presented to a user. FIG. 4A illustrates a smart phone 400, which may be one embodiment of user device 102. As illustrated in FIG. 4A, smart phone 400 may include a display 402 on which a voice-based search GUI 404A can be presented. Voice-based GUI 404 can include a scene request prompt mechanism that the user may actuate in order to input one or more keywords or natural language search terms. In response to the input, a search result 406A can be presented to the user. In the case of this particular voice-based GUI 404A, which may be appropriate, e.g., for younger users, a single result can be presented. The single result can be, as previously described, a stitching together of relevant scenes from a single instance of media content.

Figure 4B:
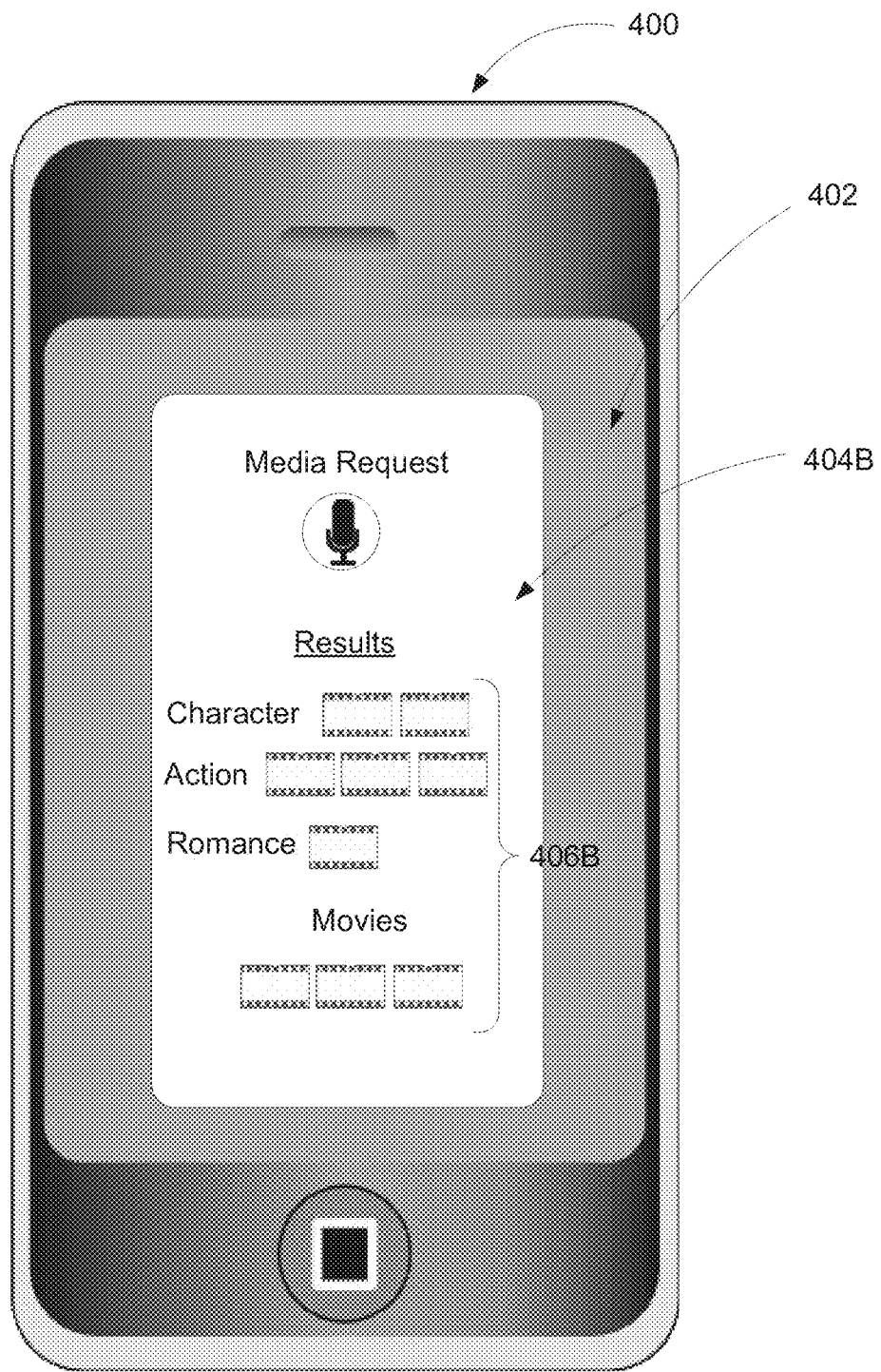
FIG. 4B illustrates an example advanced user interface for performing voice searching and displaying search results in accordance with another embodiment.

FIG. 4B illustrates another embodiment of a voice-based GUI 404B that can represent a more 'advanced' embodiment of voice-based media content searching. As previously described, the search results 406B that can be returned may include various portions of media content that are relevant to the voice-based search. This can include, for example, relevant scenes that include a particular object, a particular character(s), scenes that are relevant from a thematic or plot perspective, as well as additional media content, whether it be derivative content, other or alternative media content, etc.

The user interface may be designed to be easy to use and present the found scene(s) in a desirable, unique, and memorable way.

It should be noted that the search mechanisms or algorithms utilized in accordance with various embodiments can be configured or adapted as needed or desired. For example, the use of closed captioning or subtitle metadata can be used as an initial search reference to identify potentially relevant portions of media content. Subsequently or in conjunction with such search methods, more refined or complex camera shot or character recognition algorithms or methods can be used to further refine the search to increase the potential relevancy of search results returned to a user.

Figure 5:
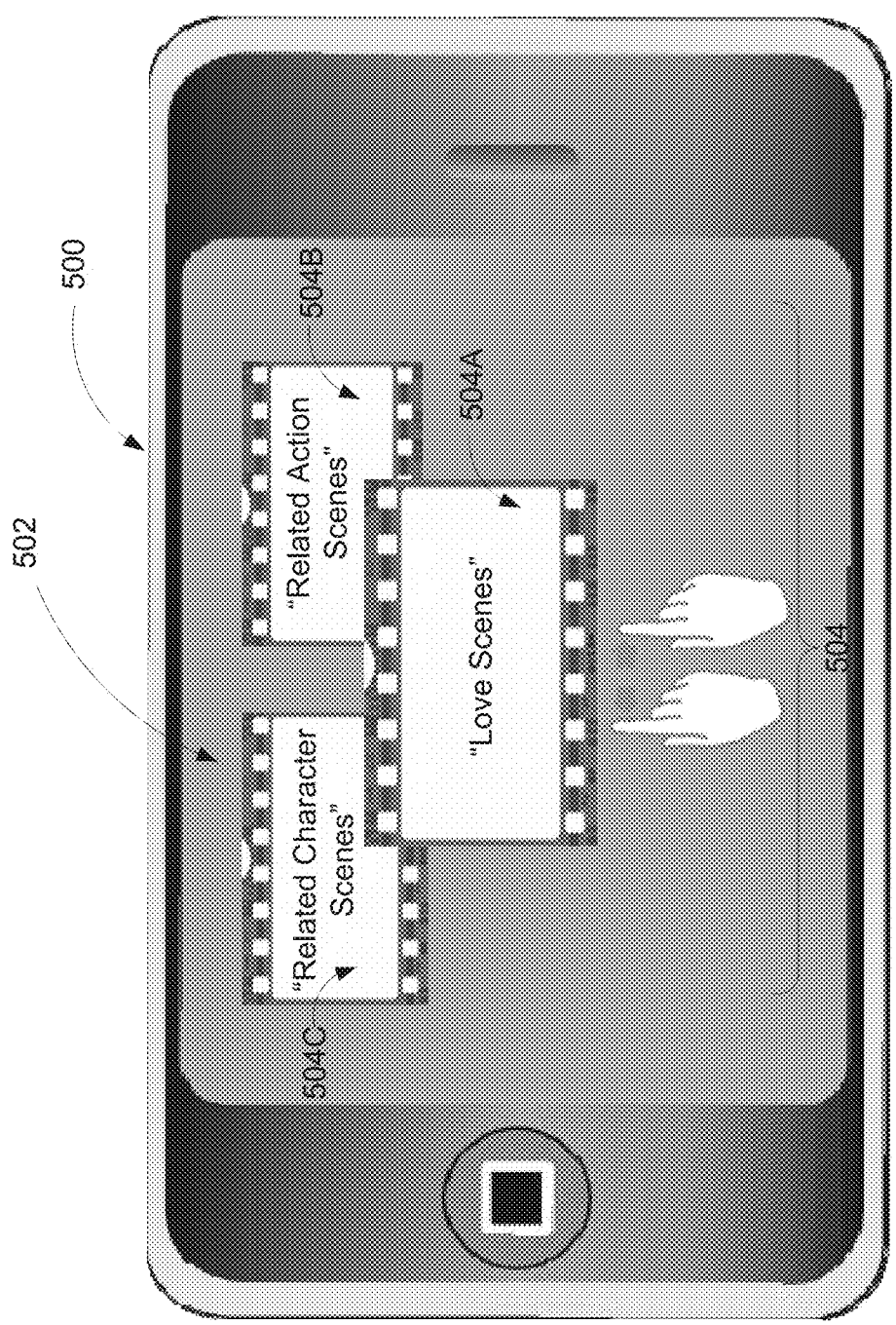
FIG. 5 illustrates an example user interface for presenting search results in accordance with one embodiment.

FIG. 5 illustrates an example of a search result GUI in accordance with yet another embodiment of the present disclosure. FIG. 5 illustrates a smart phone 500, which may be one embodiment of user device 102. As illustrated in FIG. 5, smart phone 500 may include a display 502 on which a search results GUI 504 can be presented to a user. Search results GUI 504 can present a 'most relevant' search result along with less relevant, but having potential interest to the user. For example, the user may initiate a voice-based search requesting love scenes in a movie between a character and the name of the actress portraying the character's love interest. Search results GUI 504 may therefore display an icon 504A representative of the scene(s) relevant to the voice-based search at the forefront. Additionally, related scenes such as action scenes involving the character and the actress may be presented in the background as another representative icon 504B. Additionally still, related scenes such as scenes involving the character and other characters/actors can also be presented in the background via yet another representative icon 504C. It should be noted that the relevant and related scenes or media content can also be presented using relative sizing of the icons to represent a probability 'score' reflective of its relevance relative to the voice-based search and/or 'most-relevant' search result(s).

The relevance of search results can be based on a plurality of various sources. As alluded to above, the pre-processed metadata can originate from, e.g., third-party sources, such as social media outlets, fan websites, and the like. That is, the relevancy of search results can be based on, e.g., crowd-sourced information or previous actions by the user.

A user can limit a voice search for a scene in user's collection of purchased movies, i.e., digital library. In conducting a search, media server 112 of FIG. 2 may access the user's personal library of content (movies). The user's collection can include video clips of favorite scenes in movies referred to as 'snippets.' Based upon the content of such snippets, media server 112 may skew or customize the search results returned to the user based upon what the user has previously deemed to be of interest, how the user has classified or categorized previously clipped snippets, etc. Examples of snippet technology that various embodiments of the present disclosure can leverage are described in U.S. patent application Ser. No. 14/189,908, which is incorporated herein by reference in its entirety.

It should be further noted that in the event where pre-processed metadata does not match, e.g., some voice-based keyword input by user, the search can still be performed by accessing, e.g., an electronic thesaurus or other third-party information source. For example, a user may request a search for scenes in a movie where an actor experiences a "hiccup." As opposed to a search for "love scenes" which is likely to have relevant metadata, the term hiccup may not. Accordingly, a media server, e.g., media server 112 of FIG. 2) may access the aforementioned third-party information source to determine that hiccup relates to a bodily function. Accordingly, the search may progress based on a metadata search related to "bodily function." If such a search fails to produce any results, free-form searching or a "best-guess" search can be performed. Accordingly, hierarchical searching can be utilized in accordance with various embodiments.

Referring back to FIG. 4B, it should be appreciated that the user may further refine the search results by selecting (e.g., by voice-based input, touch-based input, etc.) a first aspect of the initial search results, drilling down the first aspect, and so on. For example, a voice-based search input may be, "Show me all Disney® movies." Upon voice-based GUI 404B returning a list of all known Disney® movies, the user may utilize voice-based GUI 404B to then input the following search, "Show me all animated movies." Further still, the user may again utilize voice-based GUI 404B to initiate yet another narrowing search, "Show me all G-rated movies." It should be noted that voice-based searching in accordance with various embodiments can also be used to eliminate one or more aspects of media content that a user may wish to exclude from the search results.

Moreover, search options and/or results can be monetized in accordance with various embodiments. For example, simple searching can be provided to a user free of charge. However, should the user wish to perform more comprehensive searching, the user may be required to pay a fee to access such comprehensive search options. Additionally, with respect to search results and in the context of content discovery, a user may perform a voice-based search requesting a certain fight scene of a movie. For a nominal fee (that may be less than the charge for a complete instance of the full media content), the user can receive only the requested fight scene or derivative media content in the form of, e.g., stitched scenes having a common theme or plot perspective from multiple media content instances in accordance with the user's voice-based search request.

It should be noted that scene-stitching in accordance with various embodiments need not be limited solely to combining existing portions of media content. That is, various embodiments contemplate 'creating' new media content by, e.g., stitching together requested dialog. For example, the user may request media content that includes instances of an actor or character in which particular words or dialogue are stitched together.

Furthermore, a user can search for a scene in movies not owned by the user. Upon media server 112 finding the scene, media server 112 may a) show the entire scene, or b) just a preview (e.g., thumbnail image) of the scene to the user, and thereafter may offer to i) sell the movie to user, or ii) sell just the scene to the user (e.g., for $1 or $2).

A user can limit a search for a scene in a single movie, or multiple movies.

A user can select different ways to stitch together non-contiguous scenes, e.g., by story, timeline, by relevance; or "FastPlay" all scenes.

There may be different ways to search and rank metadata in scenes/frames in a movie in accordance with various embodiments.

A user may save a found scene as a favorite, i.e., as a Snippet.

It should be noted that although various embodiments presented herein have been described in the context of video/visual-based media content, other embodiments can be adapted for use in other contexts, such as radio broadcasting, podcasting, etc. Moreover, the systems and methods described herein can be adapted for use in allowing users/consumers to purchase/rent or access previously purchased/rented "full access" versions of "limited access" games, applications, and other such content.

Figure 6:
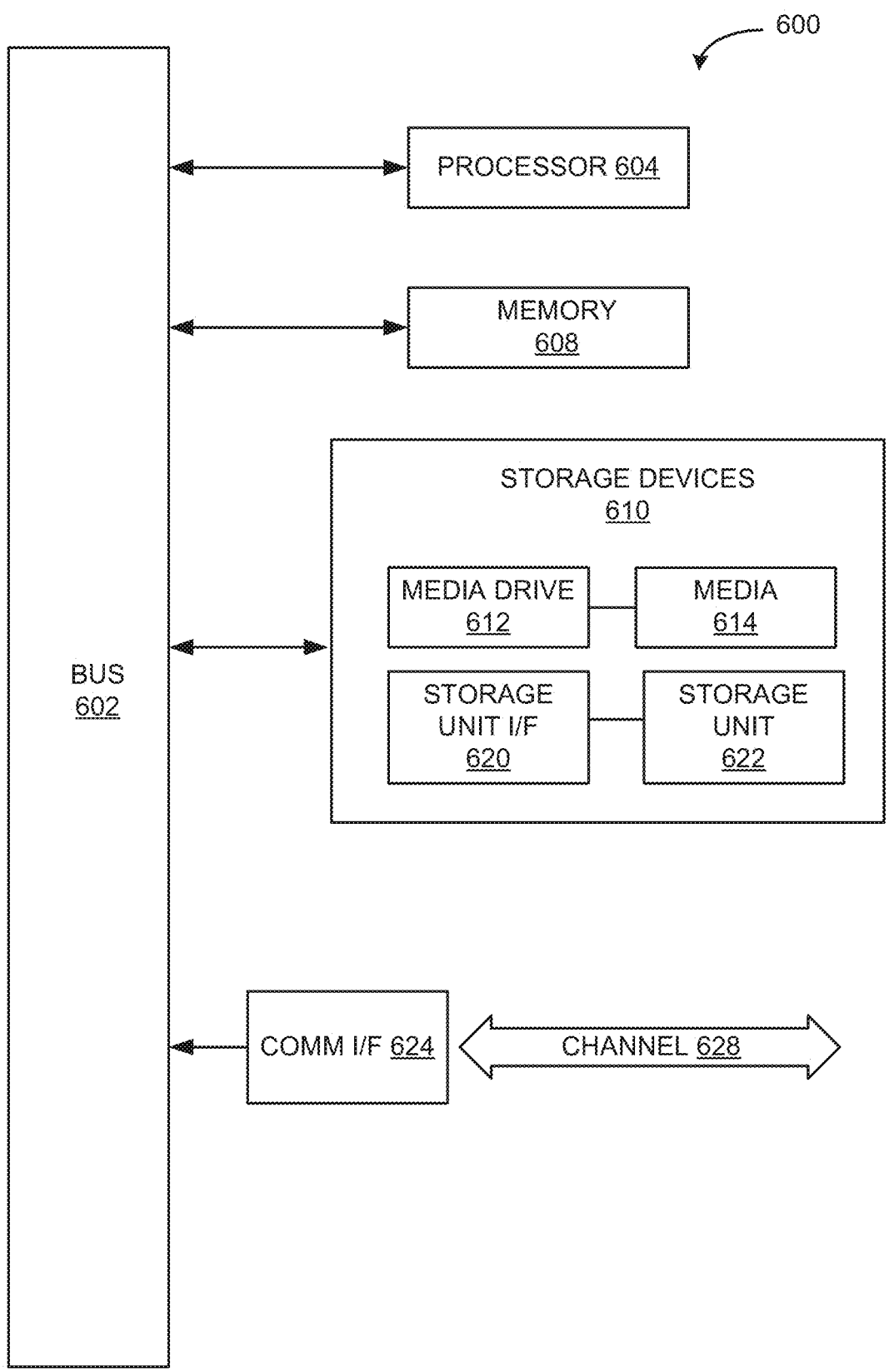
FIG. 6 is an example computing module that may be used to implement various features of embodiments described in the present disclosure.

FIG. 6 illustrates an example computing module that may be used to implement various features of the system and methods disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 6. Various embodiments are described in terms of this example-computing module 600. After reading this description, it will become apparent to a person skilled in the relevant art how to implement the application using other computing modules or architectures.

Referring now to FIG. 6, computing module 600 may represent, for example, computing or processing capabilities found within a self-adjusting display, desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. For example, computing module 600 may be one embodiment of user device 102, media server 112, and/or one or more functional elements thereof. Computing module 600 might also represent computing capabilities embedded within or otherwise available to a given device. For example, a computing module might be found in other electronic devices such as, for example navigation systems, portable computing devices, and other electronic devices that might include some form of processing capability.

Computing module 600 might include, for example, one or more processors, controllers, control modules, or other processing devices, such as a processor 604. Processor 604 might be implemented using a general-purpose or special-purpose processing engine such as, for example, a microprocessor, controller, or other control logic. In the illustrated example, processor 604 is connected to a bus 602, although any communication medium can be used to facilitate interaction with other components of computing module 600 or to communicate externally.

Computing module 600 might also include one or more memory modules, simply referred to herein as main memory 608. For example, preferably random access memory (RAM) or other dynamic memory might be used for storing information and instructions to be executed by processor 604. Main memory 608 might also be used for storing temporary variables or other intermediate information during execution of instructions to be executed by processor 604. Computing module 600 might likewise include a read only memory ("ROM") or other static storage device coupled to bus 602 for storing static information and instructions for processor 604.

The computing module 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid state drive, a magnetic tape drive, an optical disk drive, a compact disc (CD) or digital video disc (DVD) drive (R or RW), or other removable or fixed media drive might be provided. Accordingly, storage media 614 might include, for example, a hard disk, an integrated circuit assembly, magnetic tape, cartridge, optical disk, a CD or DVD, or other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing module 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory module) and memory slot, a PCMCIA slot and card, and other fixed or removable storage units 622 and interfaces 620 that allow software and data to be transferred from the storage unit 622 to computing module 600.

Computing module 600 might also include a communications interface 624. Communications interface 624 might be used to allow software and data to be transferred between computing module 600 and external devices. Examples of communications interface 624 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 600 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method, comprising:
   receiving, by a media content server, media content that includes a first scene associated with first metadata and a second scene associated with second metadata, wherein the first metadata comprises information provided by an originator of the media content, wherein the second metadata comprises automatically generated information provided by a production or editing process of the media content;
   initiating a metadata generation process to generate, based on feedback received from at least a first-user device, third metadata associated with a third scene included in the media content;
   providing access to the media content by the media content server to a second-user device;
   initiating a speech-to-text recognition process to translate a vocal user input to one or more search criteria, wherein the vocal user input is received from the second-user device;
   determining, using a hierarchical search, a plurality of scenes relevant to the one or more search criteria based on at least the first metadata, the second metadata, and the third metadata, the plurality of scenes being non-contiguous in the media content, wherein the plurality of scenes is customized based on second-user classifications of second-user favorite scenes;
   generating derivative media content by stitching together the plurality of scenes relevant to the one or more search criteria into a single media content file based on second-user selection of at least one of a plurality of stitching options; and
   providing access to the derivative media content by the media content server to the second-user device, wherein the second-user device is configured to display the derivative media content on a display of the second-user device.

2. The computer-implemented method of claim 1, wherein the first-user device is associated with a consumer of the media content.

3. The computer-implemented method of claim 1, wherein the media content comprises a movie.

4. An apparatus, comprising:
   a content database containing media content;
   a memory including computer program code, the memory and the computer program code configured to, with a processor, cause the apparatus to perform at least the following:
     receive, by a media content server, media content that includes a first scene associated with first metadata and a second scene associated with second metadata, wherein the first metadata comprises information provided by an originator of the media content, wherein the second metadata comprises automatically generated information provided by a production or editing process of the media content;
     initiate a metadata generation process to generate, based on feedback received from at least a first-user device, third metadata associated with a third scene included in the media content;
     provide access to the media content by the media content server to a second-user device;
     receive vocal user input from the second-user device;

initiate a speech-to-text recognition process to translate the vocal user input to one or more search criteria;

determine, using a hierarchical search, a plurality of scenes relevant to the one or more search criteria based on at least the first metadata, the second metadata, and the third metadata, the plurality of scenes being non-contiguous in the media content, wherein the plurality of scenes is customized based on second-user classifications of second-user favorite scenes;

generate derivative media content by stitching together the plurality of scenes relevant to the one or more search criteria into a single media content file based on second-user selection of at least one of a plurality of stitching options; and provide access to the derivative media content by the media content server to the second-user device, wherein the second-user device is configured to display the derivative media content on a display of the second-user device.

5. A media content server, comprising:

a processor; and a memory including computer program code executable by the processor to perform at least the following:

receive media content that includes a first scene associated with first metadata and a second scene associated with second metadata, wherein the first metadata comprises information provided by an originator of the media content, wherein the second metadata comprises automatically generated information provided by a production or editing process of the media content;

initiate a metadata generation process to generate, based on feedback received from at least a first-user device, third metadata associated with a third scene included in the media content;

provide access to the media content by the media content server to a second-user device;

receive vocal user input from the second-user device;

initiate a speech-to-text recognition process to translate the vocal user input to one or more search criteria;

determine, using a hierarchical search, a plurality of scenes relevant to the one or more search criteria based on at least the first metadata, the second metadata, and the third metadata, the plurality of scenes being non-contiguous in the media content, wherein the plurality of scenes is customized based on second-user classifications of second-user favorite scenes;

generate derivative media content by stitching together the plurality of scenes relevant to the one or more search criteria into a single media content file based on second-user selection of at least one of a plurality of stitching options; and provide access to the derivative media content by the media content server to the second-user device, wherein the second-user device is configured to display the derivative media content on a display of the second-user device.

6. The media content server of claim 5, wherein at least one of the first scene, the second scene, or the third scene is thematically relevant to the one or more search criteria.

7. The computer-implemented method of claim 1, wherein the first metadata comprises at least one of: a name of an actor or actress who appears in the first scene, a title of a song played during the first scene, a location shown in the first scene, or an object in the first scene.

8. The apparatus of claim 4, wherein the first metadata comprises at least one of: a name of an actor or actress who appears in the first scene, a title of a song played during the first scene, a location shown in the first scene, or an object in the first scene.

9. The computer-implemented method of claim 1, further comprising:

determining a plurality of relevance scores that correspond with the plurality of scenes.

10. The computer-implemented method of claim 1, wherein the access to the derivative media content is provided in a progress bar that indicates the plurality of scenes.

11. The computer-implemented method of claim 1, wherein at least one of the first scene, the second scene, or the third scene is thematically relevant to the one or more search criteria.

12. The apparatus of claim 4, wherein the first-user device is associated with a consumer of the media content.

13. The apparatus of claim 4, wherein the media content comprises a movie.

14. The apparatus of claim 4, wherein at least one of the first scene, the second scene, or the third scene is thematically relevant to the one or more search criteria.

15. The media content server of claim 5, wherein the first-user device is associated with a consumer of the media content.

16. The media content server of claim 5, wherein the media content comprises a movie.

17. The computer-implemented method of claim 1, further comprising:

initiating the speech-to-text recognition process to translate one or more additional vocal user inputs to one or more refinement criteria, wherein the one or more additional vocal user inputs are received from the second-user device; and determining a refined plurality of scenes by successively performing one or more refinement operations on the plurality of scenes based on the one or more refinement criteria.

18. The computer-implemented method of claim 1, wherein the second-user device is further configured to convey a measure of relevance of each of the plurality of scenes via at least one of size or color.

19. The computer-implemented method of claim 1, wherein the one or more search criteria pertain to a content discovery request.

20. The computer-implemented method of claim 1, wherein at least one of the second-user favorite scenes is specified as a favorite scene via an operation that includes replacing a video playback interface with a video clip interface, wherein the video playback interface includes a timeline to indicate playback progress via positioning of a playback scrubber on the timeline, wherein the video clip interface provides a zoomed-in view depicting a subset of the timeline and includes a plurality of clip scrubbers in lieu of the playback scrubber, and wherein each of the plurality of clip scrubbers is adjustable to specify a respective time position with greater precision than using the playback scrubber.

* * * * *